(12) United States Patent
Leupold

(10) Patent No.: US 7,354,021 B1
(45) Date of Patent: Apr. 8, 2008

(54) MAGNET FOR AN IONIC DRIVE FOR SPACE VEHICLES

(75) Inventor: Herbert A. Leupold, Eatentown, NJ (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 11/809,631

(22) Filed: Jun. 1, 2007

(51) Int. Cl.
B64G 1/40 (2006.01)
H01F 7/02 (2006.01)

(52) U.S. Cl. .................. 244/171.1; 60/202; 335/306
(58) Field of Classification Search .............. 315/111.41–111.71; 313/153, 359.1; 244/171.1; 60/202; 335/306
See application file for complete search history.

(56) References Cited

U.S. PATENT DOCUMENTS

| 4,355,236 | A | * | 10/1982 | Holsinger | 250/396 ML |
|---|---|---|---|---|---|
| 4,614,930 | A | * | 9/1986 | Hickey et al. | 335/302 |
| H591 | H | * | 3/1989 | Leupold | 29/607 |
| 4,862,128 | A | * | 8/1989 | Leupold | 335/306 |
| 4,911,627 | A | * | 3/1990 | Leupold | 425/3 |
| 5,063,004 | A | * | 11/1991 | Leupold | 264/427 |
| 5,103,200 | A | * | 4/1992 | Leupold | 335/217 |
| 5,274,309 | A | * | 12/1993 | Leupold | 315/382 |
| 5,396,209 | A | * | 3/1995 | Leupold | 335/306 |
| 5,491,459 | A | * | 2/1996 | Leupold | 335/306 |
| 5,523,731 | A | * | 6/1996 | Leupold | 335/306 |
| 5,532,666 | A | * | 7/1996 | Leupold | 335/306 |
| 5,634,263 | A | * | 6/1997 | Leupold | 29/607 |
| 5,666,098 | A | * | 9/1997 | Leupold | 335/306 |
| 6,445,130 | B1 | * | 9/2002 | Leupold | 315/4 |
| 6,525,633 | B1 | * | 2/2003 | Leupold | 335/284 |
| 6,861,935 | B1 | * | 3/2005 | Leupold | 335/306 |
| 6,989,730 | B1 | * | 1/2006 | Leupold | 335/306 |

* cited by examiner

*Primary Examiner*—Ramon M. Barrera
(74) *Attorney, Agent, or Firm*—Michael Zelenka; George B. Tereschuk

(57) ABSTRACT

A toroidally shaped magnetic device with distortion-free exit and access ports provides toroidal magnetic ionic drive systems for vehicles that achieve a more operationally efficient, uniform and stronger radial magnetic field. This is accomplished by magnetizing a group of magic cylinder sections in a cylindrical direction and affixing them to a uniformly magnetized cylindrical shell with no magnetic field in its central cavity to produce composite cylindrical magnetic segments magnetized in a cylindrical direction with a central cavity and a uniform interior magnetic field. The composite segments are then bent into a toroidal tube and configured in such a way that longitudinal slots can be removed from the outer surface for exit and access ports. Other embodiments include a magnetic propulsion system for space vehicles and methods for magnetizing the toroidal ionic drive structure for a vehicle.

20 Claims, 2 Drawing Sheets

MAGNET FOR AN IONIC DRIVE FOR SPACE VEHICLES

GOVERNMENT INTEREST

The invention described herein may be manufactured, used, imported, sold, and licensed by or for the Government of the United States of America without the payment to me of any royalty thereon.

FIELD OF THE INVENTION

The present invention relates to magnetic propulsion systems. More particularly, the present invention relates to devices and methods providing a magnetic field for space vehicle thrusters.

BACKGROUND OF THE INVENTION

The proposed propulsion systems for ion Hall propulsion of long range space vehicles generally require a radially oriented magnetic field in a toroidal cavity. However, the standard sources of such radially oriented magnetic fields are neither sufficiently uniform nor strong enough to provide the necessary operational efficiency. FIG. 1 depicts the cross-section of a prior art toroidal magnetic structure with a principal axis 17 having a radial magnet 11, outer magnetic coil 12, lens 13 and anode 14 that generates a radial magnetic field with field lines 15. This prior art structure can supply an adequate radial field component for only marginal operational efficiency in the direction of arrow 16 along thruster axis 17. The FIG. 1 prior art structure operates with only marginal efficiency because it is hampered by the undesired axial field components 18 and minimal field strength. Other types of magnetically-generated propulsion systems are needed to overcome the drawbacks of inefficient operation caused by undesired axial field components and a weak magnetic field.

The drawbacks and deficiencies of inefficient operations, unwanted axial magnetic field components and weak magnetic fields found in prior art magnetic propulsion systems could be alleviated with a magnetic structure that generates a stronger radial magnetic field suitable for a more efficient magnetic propulsion. Those skilled in the art will readily observe that a number of potential magnetic structures with differing shapes and geometries could be employed to provide an enhanced magnetic field for a magnetic propulsion system such as the magic ring or magic cylinder, but the conventional prior art magnetic structures also suffer from a number of drawbacks and shortcomings such as excessive weight or cumbersome size.

Thus, there has been a long-felt need to develop a new magnetic structure that is suitable for a magnetic propulsion system and does not suffer from the drawbacks, deficiencies, shortcomings and disadvantages of prior art magnetic structures. Up until now, this long-felt need for a new structure for a magnetic propulsion system has not been answered.

SUMMARY OF THE INVENTION

One promising approach that deserves further consideration is the prior art magic toroid. Referring now to FIG. 2, there is depicted a magic toroid with an outer shell 21, hollow central cavity 22 and radial magnetic field, represented by large arrows 23. The magic toroid is a cylindrical magic ring that has been configured into a hollow toroidal shape. One approach for fabricating toroidal magnetic structures is described in this inventor's U.S. Pat. No. 4,911,627 entitled "Apparatus For Fabrication Of Permanent Magnet Toroidal Rings," which is incorporated herein by reference. The main advantage of the magnetic, or "magic," toroid is that it is capable of producing relatively strong uniform radial magnetic fields with minimal structural masses.

Despite these advantages, the magic toroid is a completely closed structure that does not provide an exit for an anion beam. These drawbacks cannot be overcome by merely cutting a circular exit port at the top of the structure because that would both decrease and distort the internal radial magnetic field. This inventor's U.S. Pat. No. 5,396,209 entitled "Light-Weight Magnetic Field Sources Having Distortion-Free Access Ports," points to a number of possible solutions for the magic toroid's lack of either an exit port or working space access. That invention's spherical and cylindrical magnetic structures provide distortion-free access to the working space with spherical and cylindrical cavities, and this approach could also be used with a toroidally shaped magnet to resolve the long-standing shortcomings, drawbacks and disadvantages of prior art magnetic propulsion systems. The toroidally-shaped ionic drive magnet of the present invention advantageously includes a distortion free exit port that is not available in prior art magnetic structures.

It is an object of the present invention to provide a toroidally shaped magnetic device with a distortion-free exit port.

It is another object of the present invention to provide a toroidally shaped magnetic device with distortion-free exit ports in order to provide a more operationally efficient, uniform and stronger radial magnetic field.

It is still a further object of the present invention to configure a toroidally shaped magnetic device with distortion-free exit ports to release unwanted electrons from a central cavity in order to provide for a more operationally efficient, uniform and stronger radial magnetic field that does not interfere with a vehicular propulsion system.

It is yet another object of the present invention to provide a method for forming a toroidally shaped magnetic device with distortion-free exit ports in order to provide a more operationally efficient, uniform and stronger radial magnetic field.

These and other objects and advantages are accomplished by this invention's toroidally-shaped magnetic device for propulsion systems, comprising a section of a magic cylinder magnetized in a cylindrical direction that is added to a uniformly magnetized cylindrical shell with no magnetic field in its central cavity to produce a cylindrical shell with a uniform interior magnetic field configured in such a way that a slot can be removed from the cylindrical shell for an exit port, which structure is then bent to form a toroidally-shaped ionic drive magnet. The present invention also encompasses a magnetic propulsion system for space vehicles and methods for magnetizing a toroidal ionic drive structure for a vehicle.

DETAILED DESCRIPTION OF THE DRAWINGS

The present invention resolves the long-standing problems, shortcomings and limitations of prior art magnetic propulsion systems caused by undesired axial field components and a weak magnetic field by assembling a group of magic cylinder sections that are magnetized in a cylindrical direction and then added to a uniformly magnetized cylindrical shell without a central magnetic field. By assembling magic cylinder sections with a cylindrical magnetization direction into a uniformly magnetized cylindrical shell without a central magnetic field, this invention's cylindrical magnetic segments produce a cylindrical shell with a uniform interior magnetic field from which a slot can be advantageously removed to construct an exit port. The cylindrical magnetic segments are then bent to form this invention's toroidal ionic drive magnet.

Figure 1:
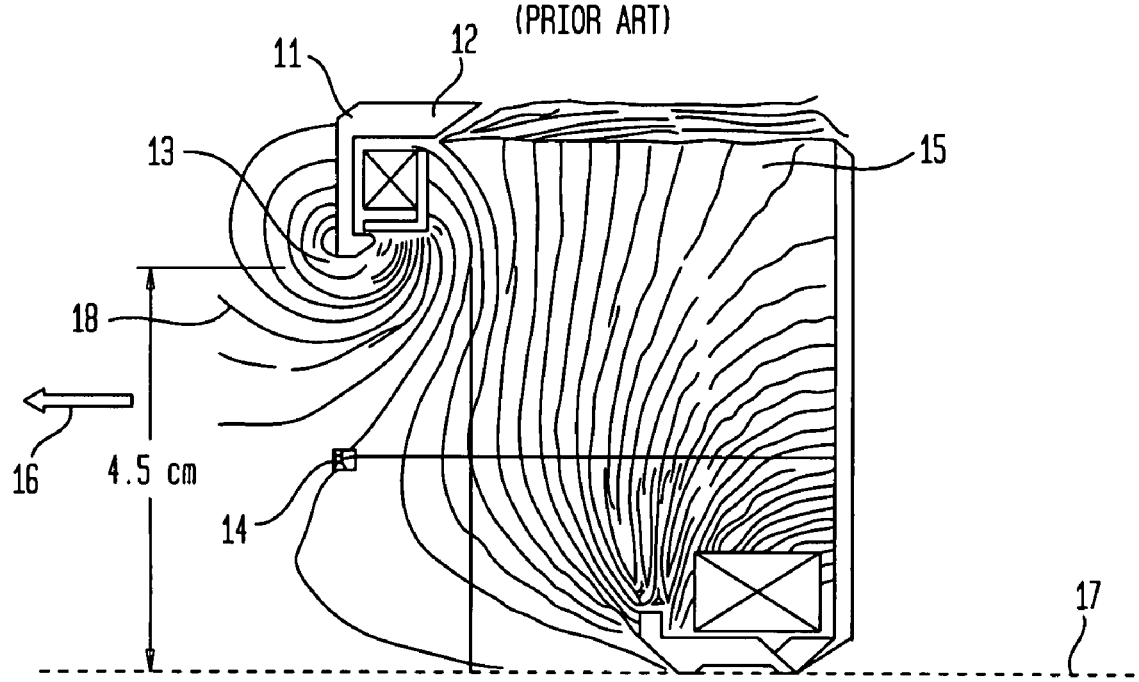
FIG. 1 depicts a cross-sectional view of a prior art magnetic structure that generates a radial magnetic field.
Figure 2:
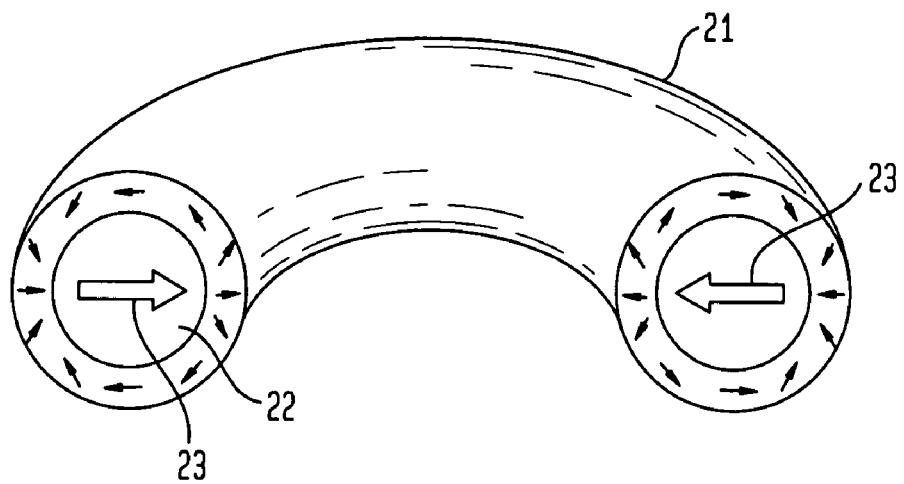
FIG. 2 depicts a cut-away view of a prior art radial magic toroid magnetic structure.
Figure 3:
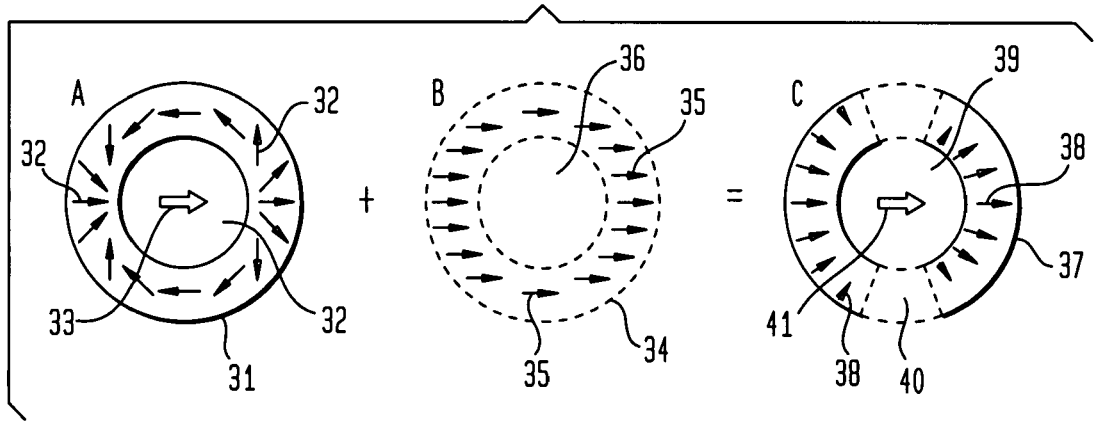
FIGS. 3A-3C illustrates cross-sectional side views of selected magnetic structures and combined directions of magnetization.

Referring now to FIGS. 3A-3C, the present invention's toroidal ionic drive magnet can be better understood by comparing cross-sectional views of three selected magnetic structures. FIG. 3A depicts a cross-sectional side view of a magic cylinder section 31, FIG. 3B is a cross-sectional side view of a uniformly magnetized cylindrical shell 34 and FIG. 3C is a cross-sectional side view of a composite cylindrical magnetic structure 37. The FIG. 3A magic cylinder section 31 is magnetized in the directions of the small arrows 32 according to the formula:

$$\gamma = 2\theta \qquad \text{Equation (1)}$$

where $\theta$ is the coordinate angle and $\gamma$ is the angle of magnetization with respect to the polar axis with an interior magnetic field represented by large arrow 33. The FIG. 3B uniformly magnetized cylindrical shell 34 is magnetized in the directions of small arrows 35. Those skilled in the art will readily appreciate that the FIG. 3B uniformly magnetized cylindrical shell 34 produces no interior magnetic field in the central cavity 36.

Adding the magnetization vectors of the FIG. 3A magic cylinder section 31 to those of the FIG. 3B uniformly magnetized cylindrical shell 34 results in the FIG. 3C composite cylindrical structure 37, which produces the same uniform interior magnetic field, represented by large arrow 41, in its interior central cavity 38 as that produced by the FIG. 3A magic cylinder section 31. The FIG. 3C composite cylindrical structure 37 is also magnetized in a cylindrical direction, as represented by small arrows 38, with a central cavity 39 and a uniform interior magnetic field 41 in the central cavity 39. Note, however, that after the vector addition, the slot 40 section, depicted by the broken lines, of the composite cylindrical structure 37 at the magnetic equator requires no magnetization so that that slot 40 portion of the composite cylindrical structure 37 can be removed without disturbance, reduction or distortion of the interior magnetic field 41 to provide the necessary exit port for escape of unwanted electrons from the central cavity 39 of the composite cylindrical structure 37.

The small arrows 38 all have unequal lengths, which indicates a varying magnetic strength. If the largest possible magnetization strength were used at all points of the magnetic structure, one could leave the magnetic field unaltered if material were pared away to compensate for the greater strength according to the formula:

$$B_r \left[ \ln\left(\frac{r_o}{r_i}\right) \right] = \text{constant} \qquad \text{Equation (2)}$$

where $B_r$ is the magnetic remanence of the magnetic material and $r_o$ and $r_i$ are the outer and inner radii, respectively. The result is the single magnetic segment 45 depicted in FIG. 4.

Figure 4:
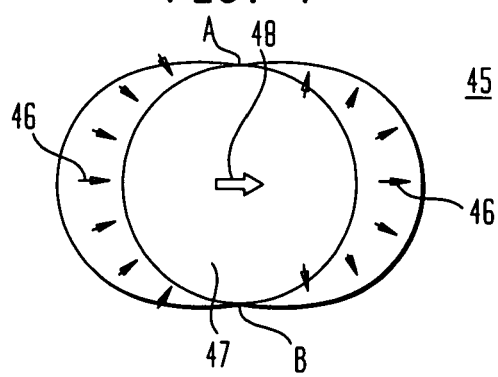
FIG. 4 depicts a cross-sectional view of a composite cylindrical magnetic segment of the present invention.

Referring now to FIG. 4, there is depicted a cross-sectional view of a single cylindrical magnetic segment 45 of this invention's toroidal magnetic structure before being formed into a toroid with multiple cylindrical magnetic segments 45. The cylindrical magnetic segment 45 is magnetized in a cylindrical direction, as represented by small arrows 46, with a central cavity 47 and a uniform magnetic field 48. The small arrows 46 all have unequal lengths, which indicates a varying magnetic strength.

Figure 5:
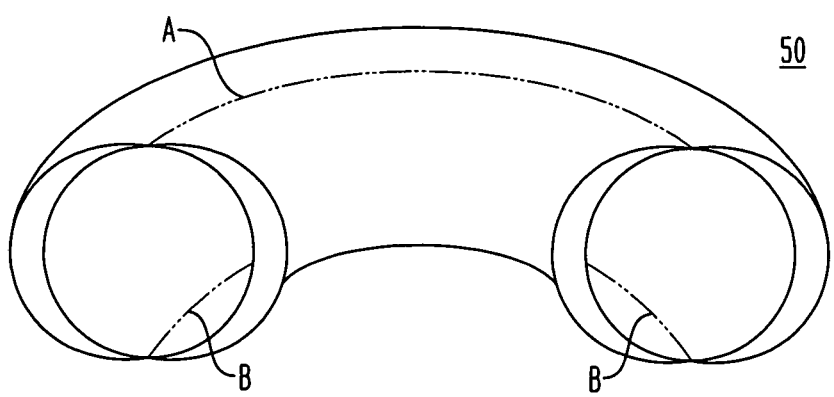
FIG. 5 depicts a front perspective view of the toroidal ionic drive magnet of the present invention.

Referring now to FIG. 5, there is depicted the toroidal ionic drive magnet 50 of the present invention, comprising multiple FIG. 4 cylindrical magnetic segments 45 bent into a toroidal tube with ports A and B. Material can be removed from either the FIG. 4 cylindrical magnetic segment 45 at point A or point B of the outer surface prior to assembly without changing the interior magnetic field 48 appreciably because at these locations the magnetic material is thin and its contribution to the interior magnetic field 48 is minimal. Similarly, the material at point A and point B of the outer surface could also be removed from assembled FIG. 5 toroidal ionic drive magnet 50 for the same reason. Of course, the wider that the slots at point A and point B are cut, the more magnetic field reduction and distortion will result. If point A is chosen as the exit slot location, than a second slot at point B could also be useful for the insertion of a copper or high conductivity heat conduit from the interior where considerable heat is generated from formation of plasma. The exit port at point A is a critical feature of this invention because unwanted electrons are then forced into a circular orbit in order to eliminate interference with the propulsion of the vehicle.

The present invention also encompasses a toroidal magnetic ionic drive system for a space vehicle and a method for magnetizing a toroidal ionic drive structure for a vehicle. The method for magnetizing a toroidal ionic drive structure for a vehicle comprises the steps of forming a group of magic cylinder sections; forming a uniformly magnetized cylindrical shell having a central cavity and a first plurality of magnetization vectors; providing a vehicle with a propulsion system; magnetizing the group of magic cylinder sections in a cylindrical direction, with each magic cylinder section having an interior magnetic field and a second plurality of magnetization vectors; affixing the group of magic cylinder sections to the cylindrical shell; combining the first and second plurality of magnetization vectors; forming a group of composite cylindrical magnetic segments, each composite segment, being magnetized in a cylindrical direction with a varying magnetic field, having a central cavity and a uniform interior magnetic field; bending the group of composite segments into a toroidal tube; removing a first slot section from an outer surface of the toroidal tube; providing a longitudinal exit port; and allowing electrons to escape from the central cavity without distorting the uniform interior magnetic field in order to eliminate unwanted interference with the propulsion system.

A number of variations of the devices and methods of the present invention are also possible, including differences in the FIG. 5 toroidal form and methods that sacrifice minimal mass for ease of manufacture. It is to be further understood that other features and modifications to the foregoing detailed description are within the contemplation of the present invention, which is not limited by this detailed description. Those skilled in the art will readily appreciate that any number of configurations of the present invention and numerous modifications and combinations of materials, components, arrangements and dimensions can achieve the results described herein, without departing from the spirit and scope of this invention. Accordingly, the present invention should not be limited by the foregoing description, but only by the appended claims.

What I claim is:

1. A toroidal magnetic ionic drive structure for a vehicle, comprising:
    a group of magic cylinder sections;
    a uniformly magnetized cylindrical shell;
    said vehicle having a propulsion system;
    said cylindrical shell having a central cavity and a first plurality of magnetization vectors;
    said group of magic cylinder sections, having an interior magnetic field and a second plurality of magnetization vectors, are magnetized in a cylindrical direction;
    said group of magic cylinder sections being affixed to said cylindrical shell provides a plurality of composite cylindrical magnetic segments;
    said first and second plurality of magnetization vectors being combined;
    each of said plurality of composite segments, being magnetized in a cylindrical direction with a varying magnetic strength, having a central cavity and a uniform interior magnetic field;
    said plurality of composite segments being bent into a toroidal tube; and
    a first slot section removed from an outer surface of said toroidal tube provides a longitudinal exit port allowing a plurality of electrons to escape from said central cavity without distorting said uniform interior magnetic field in order to eliminate unwanted interference with said propulsion system.

2. The toroidal magnetic ionic drive structure for said vehicle, as recited in claim 1, further comprising said uniform interior magnetic field being equivalent to said interior magnetic field.

3. The toroidal magnetic ionic drive structure for said vehicle, as recited in claim 2, further comprising a second slot section being removed from said outer surface provides a longitudinal access port for a heat conduit from said central cavity.

4. The toroidal magnetic ionic drive structure for said vehicle, as recited in claim 3, further comprising said heat conduit being a high conductivity heat conduit.

5. The toroidal magnetic ionic drive structure for said vehicle, as recited in claim 3, further comprising said slot sections being narrow in order to minimize reduction and distortion of said uniform interior magnetic field.

6. The toroidal magnetic ionic drive structure for said vehicle, as recited in claim 3, further comprising said structure being configured to sacrifice minimal mass for ease of manufacture.

7. The toroidal magnetic ionic drive structure for said vehicle, as recited in claim 3, further comprising said structure being a toroidal ionic drive magnet.

8. A toroidal magnetic ionic drive system for a space vehicle, comprising:
    a group of magic cylinder sections;
    a uniformly magnetized cylindrical shell;
    said space vehicle having a propulsion system;
    said cylindrical shell having a central cavity and a first plurality of magnetization vectors;
    said group of magic cylinder sections, having an interior magnetic field and a second plurality of magnetization vectors, are magnetized in a cylindrical direction;
    said group of magic cylinder sections being affixed to said cylindrical shell provides a plurality of composite cylindrical magnetic segments;
    said first and second plurality of magnetization vectors being combined;
    each of said plurality of composite segments, being magnetized in a cylindrical direction with a varying magnetic strength, having a central cavity and a uniform interior magnetic field;
    said plurality of composite segments being bent into a toroidal tube; and
    a first slot section removed from an outer surface of said toroidal tube provides a longitudinal exit port allowing a plurality of electrons to escape from said central cavity without distorting said uniform interior magnetic field in order to eliminate unwanted interference with said propulsion system.

9. The toroidal magnetic ionic drive system for said space vehicle, as recited in claim 8, further comprising said uniform interior magnetic field being equivalent to said interior magnetic field.

10. The toroidal magnetic ionic drive system for said space vehicle, as recited in claim 9, further comprising a second slot section being removed from said outer surface provides a longitudinal access port for a heat conduit from said central cavity.

11. The toroidal magnetic ionic drive system for said space vehicle, as recited in claim 10, further comprising said heat conduit being a high conductivity heat conduit.

12. The toroidal magnetic ionic drive system for said space vehicle, as recited in claim 10, further comprising said slot sections being narrow in order to minimize reduction and distortion of said uniform interior magnetic field.

13. The toroidal magnetic ionic drive system for said space vehicle, as recited in claim 10, further comprising said system being configured to sacrifice minimal mass for ease of manufacture.

14. A method for magnetizing a toroidal ionic drive structure for a vehicle, comprising the steps of:
    forming a group of magic cylinder sections;
    forming a uniformly magnetized cylindrical shell, said cylindrical shell having a central cavity and a first plurality of magnetization vectors;
    providing a vehicle having a propulsion system;
    magnetizing said group of magic cylinder sections in a cylindrical direction, each of said magic cylinder sections having an interior magnetic field and a second plurality of magnetization vectors;
    affixing said group of magic cylinder sections to said cylindrical shell;
    combining said first and second plurality of magnetization vectors;
    forming a plurality of composite cylindrical magnetic segments, each of said plurality of composite segments, being magnetized in a cylindrical direction with a varying magnetic field, having a central cavity and a uniform interior magnetic field;
    bending said plurality of composite segments into a toroidal tube;

removing a first slot section from an outer surface of said toroidal tube;

providing a longitudinal exit port; and allowing a plurality of electrons to escape from said central cavity without distorting said uniform interior magnetic field in order to eliminate unwanted interference with said propulsion system.

15. The method for magnetizing the toroidal ionic drive structure for said vehicle, as recited in claim 14, further comprising the step of causing said uniform interior magnetic field to be equivalent to said interior magnetic field.

16. The method for magnetizing the toroidal ionic drive structure for said vehicle, as recited in claim 14, further comprising the steps of:

removing a second slot section from said outer surface; and providing a longitudinal heat conduit from said central cavity.

17. The method for magnetizing the toroidal ionic drive structure for said vehicle, as recited in claim 16, wherein said heat conduit is a high conductivity heat conduit.

18. The method for magnetizing the toroidal ionic drive structure for said vehicle, as recited in claim 16, further comprising the step of narrowing said slot sections to minimize reduction and distortion of said uniform interior magnetic field.

19. The method for magnetizing the toroidal ionic drive structure for said vehicle, as recited in claim 16, further comprising the step of configuring said structure to sacrifice minimal mass for ease of manufacture.

20. The method for magnetizing the toroidal ionic drive structure for said vehicle, as recited in claim 16, wherein said magnetic structure is a toroidal ionic drive magnet.

* * * * *